(12) United States Patent
Hagiwara et al.

(10) Patent No.: US 8,835,089 B2
(45) Date of Patent: Sep. 16, 2014

(54) TONER AND METHOD FOR PRODUCING THE SAME, AND TWO-COMPONENT TYPE DEVELOPER

(71) Applicant: Canon Kabushiki Kaisha, Tokyo (JP)

(72) Inventors: Emi Hagiwara, Yokohama (JP); Yasunori Chigono, Atsugi (JP); Hirokazu Usami, Kawasaki (JP); Manami Haraguchi, Yokohama (JP); Ryo Inoue, Kawasaki (JP); Shintaro Ishida, Toda (JP); Tomoaki Miyazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 13/652,080

(22) Filed: Oct. 15, 2012

(65) Prior Publication Data

US 2013/0101931 A1  Apr. 25, 2013

(30) Foreign Application Priority Data

Oct. 19, 2011 (JP) ................ 2011-229342

(51) Int. Cl.
*G03G 9/087* (2006.01)
*G03G 9/097* (2006.01)
*G03G 9/08* (2006.01)
*B82Y 30/00* (2011.01)

(52) U.S. Cl.
CPC ............ *B82Y 30/00* (2013.01); *G03G 9/09716* (2013.01); *G03G 9/0825* (2013.01); *G03G 9/09725* (2013.01); *G03G 9/097* (2013.01)
USPC .................. 430/110.1; 430/137.16

(58) Field of Classification Search
CPC . G03G 9/097; G03G 9/09725; G03G 9/0825; G03G 9/09716
USPC .......................... 430/110.1, 137.16
See application file for complete search history.

(56) References Cited

U.S. PATENT DOCUMENTS

| | | | |
|---|---|---|---|
| 5,432,035 A * | 7/1995 | Katagiri et al. ............ 430/108.2 |
| 6,647,229 B2 | 11/2003 | Haraguchi et al. |
| 7,767,370 B2 | 8/2010 | Ishigami et al. |
| 7,877,030 B2 | 1/2011 | Horie et al. |
| 7,906,262 B2 | 3/2011 | Ishigami et al. |
| 8,114,562 B2 | 2/2012 | Ishigami et al. |

(Continued)

FOREIGN PATENT DOCUMENTS

| | | |
|---|---|---|
| JP | 2001-175025 A | 6/2001 |
| JP | 2006-39023 A | 2/2006 |
| JP | 4141721 B2 | 8/2008 |

*Primary Examiner* — Peter Vajda
(74) *Attorney, Agent, or Firm* — Fitzpatrick, Cella, Harper and Scinto

(57) ABSTRACT

A toner containing toner base particles and an external additive, wherein regions with different tribocharging polarities with respect to a magnetic carrier are present in a domain-matrix structure on the surface of the toner base particles. The island region B has a predetermined height, the external additive has a reverse polarity to the region B in terms of tribocharging polarity to the magnetic carrier, the external additive contains a first external additive having a number-average primary particle size of 80-150 nm and a second external additive having a number-average primary particle size of 10-60 nm, and an average coverage Cb (%) with the first external additive in the region B is 27-100% and a coverage Ca (%) with the first external additive in the sea region A is 12% or less.

8 Claims, 4 Drawing Sheets

(56) References Cited

U.S. PATENT DOCUMENTS

| | | |
|---|---|---|
| 2010/0183971 A1 | 7/2010 | Fujikawa et al. |
| 2010/0248126 A1 | 9/2010 | Ishigami et al. |
| 2011/0097661 A1 | 4/2011 | Ishigami et al. |
| 2012/0094225 A1 | 4/2012 | Ishigami et al. |
| 2012/0156604 A1 | 6/2012 | Fukatsu et al. |

* cited by examiner

DIFFICULT TO SEPARATE

EASY TO SEPARATE

EASY TO SEPARATE

TONER AND METHOD FOR PRODUCING THE SAME, AND TWO-COMPONENT TYPE DEVELOPER

BACKGROUND OF THE INVENTION

1. Field of the Invention

The present invention relates to a toner and a method for producing the same for use in an electrophotographic image forming apparatus such as a copier and a printer.

2. Description of the Related Art

Recently, an image forming apparatus for performing large quantity printing at a high speed has been developed. The image forming apparatus is required to continuously give a high-quality print image in an energy saving manner.

In order to continuously achieve a high-quality print image in an energy saving manner by a high-speed image forming apparatus, a toner having a lower Tg and a finer particle size is used. If the Tg of a toner is lower, the surface of a toner particle is softer, and the performing of large quantity printing (printing many sheets) causes an external additive attached to the surface of a toner particle to be embedded in the toner particle, thereby not enabling maintaining a stable charge amount. Therefore, it is difficult to continuously obtain a high-quality print.

In general, as additives for controlling a charge amount, silica and a charge controlling agent are attached to the surface of a toner. Collision between a toner and a toner or collision between a toner and a carrier is repeated during stirring of a developer to allow such additives attached to the surface to be separated from the surface of a toner and to be embedded in a toner mother material, and thus such external additives cause decrease in charge giving function to result in a toner having a low charge amount. Deteriorations in chargeability and transferability cause image defects such as variation in image density.

Currently, full coloration of an image proceeds, and thus there is a demand for dealing with various printing patterns. For example, there is a higher need for such an image that a color part is incorporated in a black letter image in a small amount, rather than a photographic image using all colors in an office. In such a case, while a toner of a certain color having a high print percentage is consumed in a large amount, with respect to another color having a low print percentage, a fresh toner thereof is slowly consumed and thus the stirring time of a developer in a developing unit is significantly increased, thereby remarkably causing an additive on the surface of a toner to be separated and an external additive to be embedded to a toner mother material.

In particular, a toner having a lowered Tg easily causes an external additive to be embedded due to the softness of a resin, to result in toner aggregation and a weakly charged toner, thereby causing image defects such as variation in image density.

As a measure for preventing toner aggregation, a technique is disclosed in which a large size external additive is added and a toner having a core-shell structure whose shell has a high Tg is used (see, e.g., Japanese Patent Application Laid-Open No. 2001-175025).

As a measure for preventing an external additive from being embedded, a technique is disclosed in which a plurality of inorganic particles having mutually different particle sizes (for example, large size external additives and small size external additives) are used to give a spacer function to large size external additives, thereby attempting to stabilize developability and transferability (see, e.g., Japanese Patent Application Laid-Open No. 2006-39023).

As an additional measure for preventing an external additive from being separated, a technique is disclosed in which a plurality of external additives having mutually different shapes and work functions besides the different particle size are used to prevent an external additive from being separated from toner base particles, thereby stabilizing chargeability. The measure is specifically described with reference to FIGS. 4A to 4D. Toner base particles 8a is constituted by an external additive 12 externally added. For the external additive 12, two types of hydrophobic negatively chargeable silicas ($SiO_2$) 13 and 14 having different average primary particle sizes, small particle size and large particle size, and hydrophobic rutile anatase type titanium dioxide ($TiO_2$) 15 are used, respectively. In this case, the hydrophobic negatively chargeable silica 13 constitutes a first external additive, and the hydrophobic rutile anatase type titanium dioxide 15 constitutes a second external additive. Herein, the rutile anatase type titanium dioxide 15 has a spindle shape having a longer axis diameter and a shorter axis diameter, and in a negatively charged toner 8, the longer axis diameter of the rutile anatase type titanium dioxide 15 is set to be greater than the average primary particle size of the negatively chargeable silica 13 and 14.

Thus, the rutile anatase type titanium dioxide 15 is certainly attached to the toner base particles 8a via the negatively chargeable silica 13 and thus is hardly separated from the toner base particles 8a. Then, the toner base particles 8a is negatively charged by the negatively chargeable silica 13 and 14, and prevented from being excessively charged by the rutile anatase type titanium dioxide 15. Thus, charge characteristics are stabilized for a long period, and durability and transfer efficiency are enhanced (see, e.g., Japanese Patent No. 4141721).

However, in the above conventional methods for suppressing the separation of the additives from the surface of the toner and the embedding of the external additive in the toner mother material, an external pressure is applied to the toner particle by collision between toners or between a toner and a carrier or by parts in the developing unit, such as a blade, to thereby cause the external additive to be embedded in the toner mother material or to be separated from the surface of the toner mother material particle under the condition where a large number of manuscripts having various print percentages, in particular, manuscripts having a low print percentage (for example, print percentage: 1%) are printed in a high-speed image forming apparatus or under the printing condition where a toner remains in the developing unit for a long time because of having a low print percentage. Accordingly, the charging function of the external additive to the toner is made constant and also the spacer effect by the external additive is difficult to be stably maintained. Therefore, both of charge characteristics and transfer characteristics are difficult to be maintained over a long period, thereby causing deteriorations in chargeability, developability, transferability and the like. As a result, there is such a problem that deterioration in image quality, such as reduction in image density, is caused.

SUMMARY OF THE INVENTION

The present invention has been made under the above circumstances and is directed to provide such a toner that even if a large number of manuscripts having a low print percentage are printed, suppressing the separation of a charge controlling additive attached to the surface of a toner and the embedding of the additive in a toner mother material allows the toner to have both of stable charge characteristics and transfer characteristics demanded over a long period, thereby suppressing reduction in image density and deterioration in transferability to continuously obtain a high-quality print image.

The present invention provides a toner comprising toner base particles each of which contains a binder resin and a coloring agent, and an external additive, wherein each of the toner base particles has a domain-matrix structure containing a region A as a matrix region and a region B as a domain region on a surface thereof, a polarity of a triboelectric charge of the region A with respect to a magnetic carrier to be used for charging the toner is different from that of the region B, the region B has a flat shape having an average height of 78 nm or more and 163 nm or less, a polarity of a triboelectric charge of the external additive with respect to the magnetic carrier is different from that of the region B, the external additive contains a first external additive X having a number-average primary particle size of 80 nm or more and 150 nm or less, and a second external additive Y having a number-average primary particle size of 10 nm or more and 60 nm or less, and wherein an average coverage Cb (%) with the first external additive X in the region B is 27% or more and less than 100%, and an average coverage Ca (%) with the first external additive X in the region A is 12% or less.

The present application also provides a method for producing the toner, including forming a mixture by mixing with the first external additive and the toner base particles, and adding the second external additive to the mixture and mixing them.

The present application also provides a two-component type developer containing a toner and a magnetic carrier, wherein the toner has the above composition.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, the present invention will be described in detail, but embodiments of the present invention are not limited to the following description.

Figure 1:
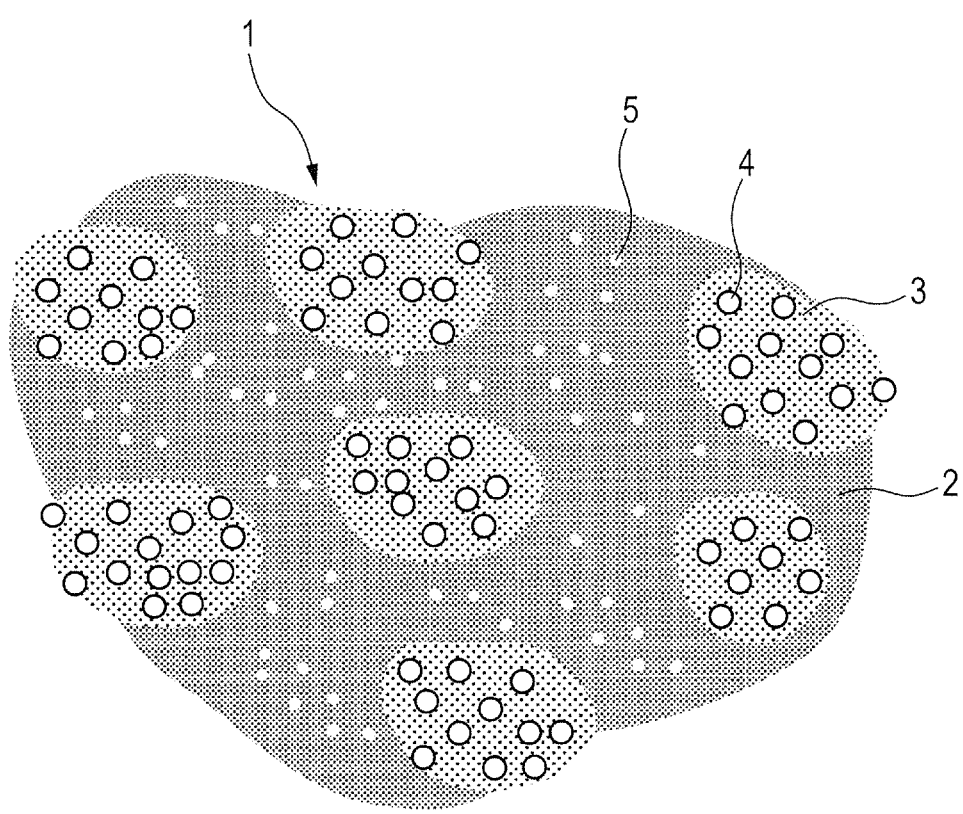
FIG. 1 is a schematic view illustrating one example of a toner particle that is an embodiment to which the present invention can apply.

FIG. 1 illustrates a schematic view illustrating one example of a toner particle that is an embodiment to which the present invention can apply. FIG. 1 illustrates a toner particle 1 of an embodiment of the present invention, on which regions with different tribocharging polarities with respect to a magnetic carrier are present in a domain-matrix structure, and a discontinuous flat portion (hereinafter, referred to as region B) 3 is present on the surface of the toner particle 1. A portion other than the region B (hereinafter, referred to as region A) 2 corresponds to the surface of toner base particles. As for two external additives having different particle sizes for use in the present invention, a large particle size external additive 4 (first external additive X) is mainly attached to the region B and a small particle size external additive 5 (second external additive Y) is mainly attached to the region A.

In order to achieve stable charge characteristics and powder characteristics of a toner, an external additive such as an inorganic particle is essential. Generally, titanium oxide, alumina, silica or the like is frequently used for the inorganic particle, and is present in the state of being attached to the surface of the toner base particles.

In order to realize the above-described attachment state, difference in tribocharging polarity to a magnetic particle (magnetic carrier) is utilized. The following characteristics are also utilized. As the surface of the toner base particles is softer, the external additive is more easily embedded, and as the surface is harder, the external additive is more hardly embedded; furthermore, in the case where the surface of the toner base particles has the same polarity, the external additive tends to first attach to a recessed portion or a soft portion of the surface of the toner base particles.

Specifically, for example, in the case where the region A that is a sea region on the surface of the toner base particles is negatively chargeable with respect to the magnetic particle and the region B that is a domain region is positively chargeable with respect to the magnetic particle, the negatively chargeable external additive is used. In order to realize the attachment state illustrated in FIG. 1 with more certainty, the large particle size external additive 4 is externally added to toner base particles having a flat portion before the small particle size external additive 5 is externally added. In this case, the large particle size external additive 4 that is negatively chargeable with respect to the magnetic particle attaches to the region B that is positively chargeable with respect to the magnetic particle. As a result, the region B that has been positively chargeable exhibits negative chargeability by the external additive 4 that attaches to the region B and that is negatively chargeable, and thus most of the surface of the toner particle is made negatively chargeable. Therefore, the small particle size external additive 5 that is negatively chargeable and externally added after the large particle size external additive 4 is externally added attaches to a recessed portion on the surface of the toner base particles, that is, the region A other than the region B having a flat shape.

Figure 2A:
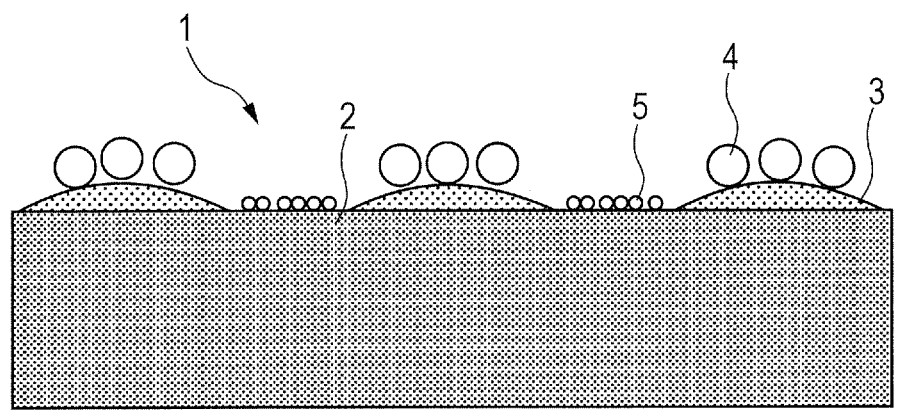
FIGS. 2A and 2B are schematic views of the cross section of a toner illustrating the change with time of an external additive by image output.
Figure 2B:
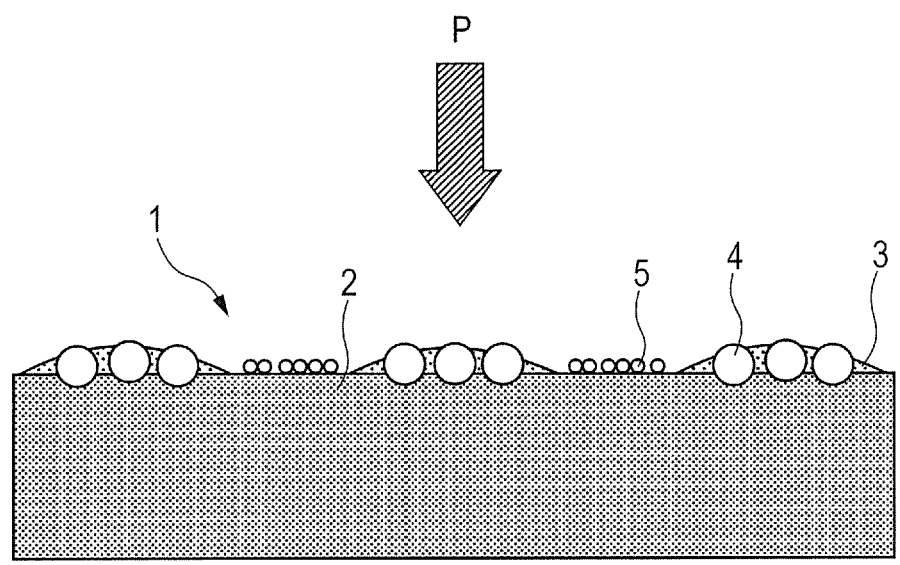

As described above, such two external additives having different particle sizes selectively attach to the surface of the toner base particles. That is, the small particle size external additive 5 attaches to the region A, and the large particle size external additive 4 attaches to the region B. FIGS. 2A and 2B are schematic views of the cross section of a toner illustrating the change with time of an external additive by image output. As illustrated in FIG. 2A, since the region B on the surface of the toner particle 1 has a flat shape, repeating image output at a low print percentage allows the surface of the toner particle 1 to easily be subjected to an external force P due to collision between a toner and a toner or between a toner and a carrier or the like, and allows the large particle size external additive 4 attaching to the region B to be aggressively embedded to and held in the region B, thereby leading to the state illustrated in FIG. 2B.

Accordingly, by allowing the two external additives 4 and 5 to have the above-described attachment state, the surface of the toner particle 1 is functionally separated into the region A having a charging function by the small particle size external additive 5 and the region B having a spacer function to reduce the embedding of the small particle size external additive 5 by a supporting strut formed of the flat portion and the large particle size external additive 4. The region B also has a function to maintain a flat shape to thereby reduce an attaching force for a drum, in order to further maintain transfer efficiency. It is very important to maintain such two functions for a long period.

As a result, a supporting strut portion having a function to suppress the embedding to thereby reduce the attaching force due to the large particle size external additive 4, and a portion having a chargeability function due to the small particle size external additive 5 are created on the surface of the toner base particles, a portion maintaining charge characteristics and a portion maintaining transfer characteristics are functionally separated from each other on the surface of a toner, and thus both of charge characteristics and transfer characteristics can be stable over a long period, thereby providing a toner that realizes both of stabilizing an image density for a long period and suppressing reduction in transfer efficiency.

The present invention will be described in more detail below.

One feature of the present invention is that an average height of the region B measured by a scanning probe microscope (hereinafter, SPM) is 78 nm or more and 163 nm or less. An average area of the region B measured by SPM can be 0.5 µm² or more and 1.5 µm² or less, and an occupying area rate of the region B measured by a scanning electron microscope (hereinafter, SEM) can be 27% or more and 50% or less.

In the case where the average height, the average area and the occupying area rate by the region B do not fall within the above numerical range, the following problems are caused. These three values vary in conjunction with one another by a preparation method described later. For example, if the average height of the region B is decreased, the average area and the occupying area rate by the region B are increased. In the case where the average height of the region B is less than 78 nm and the average area of the region B is more than 1.5 µm² or the occupying area rate is more than 50%, the embedding of the large particle size external additive 4 to the toner particle 1 in the region B is caused to lower the function as a spacer or not to enable holding the large particle size external additive 4 to the region B, thereby less contributing to enhancement in transferability. In addition, the embedding of the small particle size external additive 5 can be suppressed, and it is thus considered that chargeability deteriorates. Furthermore, it is presumed that increase in the average area or the occupying area rate easily results in a toner having a low chargeability or a toner in which a toner particle and a magnetic particle have a charging polarity reverse to the desired charging polarity, and it is thus considered that chargeability and transferability deteriorate. In the case where the average height of the region B is more than 163 nm, it is presumed that the small particle size external additive 5 attaching to the region A is made difficult to be contact with the magnetic particle, thereby causing deterioration in charging performance. In the case where the average area of the region B is less than 0.5 µm² or the occupying area rate is less than 27%, the supporting strut portion formed by the region B relative to the whole surface of the toner particle is decreased and the spacer effect is not efficient, and thus the small particle size external additive 5 is easily embedded.

The toner of the present invention contains an inorganic fine particle having a number-average primary particle size of 80 nm or more and 150 nm or less as the large particle size external additive 4. In the case where the number-average primary particle size of the large particle size external additive 4 is 80 nm or more and 150 nm or less, the small particle size external additive 5 may not be embedded to the toner particle 1 even if image output is continued over a long period, and the toner is not in contact with a drum on the face of the toner particle and the external additive is in contact with a drum on the point of the toner particle. Therefore, releasability between the toner and the drum is maintained, and as a result, deterioration in transferability can be suppressed. In the case where the number-average primary particle size is less than 80 nm, the embedding of the large particle size external additive 4 to the toner particle 1 is caused and the function as a spacer is lowered, thereby less contributing to enhancement in transferability. On the other hand, in the case where the number-average primary particle size is more than 150 nm, the inorganic fine particle is easily separated from the toner particle and is made difficult to stably attach to the surface of the toner particle, thereby reducing transfer efficiency. The external additive separated from the toner upon development contaminates the periphery of a developing unit, attaches to a photosensitive drum, a carrier and the like, and causes deterioration in charging performance, in some cases.

In the toner of the present invention, the average coverage Cb with the large particle size external additive 4 of each domain in the region B, measured by a scanning probe microscope (hereinafter, SPM) is 27% or more and less than 100%. The coverage Ca with the large particle size external additive 4 in the region A is 12% or less. In the case where the coverage with the large particle size external additive of each domain in the region B is less than 27%, the supporting strut formed in the region B is not made hard and strong by the large particle size external additive 4 and is not formed into an efficient spacer, and in addition, the small particle size external additive 5 easily attaches to the region B, thereby resulting in deterioration in chargeability. In the case where the coverage with the large particle size external additive 4 in the region A is more than 12%, the charging function of the small particle size external additive 5 is impaired by the large particle size external additive 4, and thus chargeability tends to deteriorate.

The toner of the present invention contains an inorganic fine particle having a number-average primary particle size of 10 nm or more and 60 nm or less as the small particle size external additive 5. When the number-average primary particle size of the small particle size external additive 5 is more than 60 nm, a charge giving function tends to be decreased. The number-average primary particle size of the small particle size external additive 5 can be 10 nm or more and 30 nm or less.

Then, specific materials for the toner of the present invention will be described.

<Method for Preparing Toner Base Particles>

First, a method for preparing toner base particles with no flat portion will be described.

<Method for Preparing Resin Fine Particle>

An anion surfactant (produced by Dai-Ichi Kogyo Seiyaku Co., Ltd.: NEOGEN RK) (0.15 g) and 3.15 g of N,N-dimethylaminoethanol (basic substance) are dissolved in 146.70 g of ion-exchange water (aqueous medium) to prepare a dispersion medium liquid. The dispersion medium liquid is charged in a 350 ml pressure resistant round-bottom stainless container, and subsequently, 150 g of a ground material of a "polyester resin" ((composition (molar ratio)/polyoxypropylene(2.2)-2,2-bis(4-hydroxyphenyl)propane:polyoxyethylene(2.0)-2,2-bis(4-hydroxyphenyl)propane:terephthalic acid:fumaric acid: trimellitic acid=25:25:26:20:4), Mn: 3,500, Mw: 10,300, Mw/Mn: 2.9, Tm: 96° C., Tg: 56° C.) (1 to 2 mm in size) and mixed.

Then, the pressure resistant round-bottom stainless container is hermetically connected to a high shear emulsification apparatus, CLEARMIX (manufactured by M Technique Co., Ltd.: CLM-2.2S). The mixture in the container is shear-dispersed by CLEARMIX having a number of rotor rotation of 18,000 r/min for 30 minutes while being heated at 115° C. and being pressurized at 0.18 MPa. Thereafter, while the rotation being maintained at 18,000 r/min until 50° C., cooling is carried out at a cooling rate of 2.0° C./min to obtain an aqueous dispersion 1 of a resin fine particle. As a result of observation by an electron microscope (10,000 times), the average minor axis of the resin fine particle is 0.22 µm, the average major axis is 0.56 µm and the average major axis/minor axis is 2.72, and the proportion of a particle having a major axis/minor axis of less than 1.50 is 2% relative to all particle. The 50% particle size and the 95% particle size of the resin fine particle in terms of volume distribution, measured by using a laser diffraction/scattering particle size distribution measuring apparatus (LA-920: manufactured by Horiba Ltd.), are 0.22 µm and 0.27 µm, respectively.

Aqueous Dispersion of Coloring Agent Fine Particle
Cyan pigment (produced by Dainichiseika Color & Chemicals Mfg. Co., Ltd.: Pigment Blue 15:3): 100 parts by mass
Anion surfactant (produced by Dai-Ichi Kogyo Seiyaku Co., Ltd.: NEOGEN RK): 15 parts by mass
Ion-exchange water: 885 parts by mass The foregoing materials are mixed, dissolved, and dispersed using a high-pressure impact dispersing machine, nanomizer (manufactured by Yoshida Kikai Co., Ltd.) for about 1 hour to prepare an aqueous dispersion of a coloring agent fine particle with a coloring agent dispersed. The volume-average particle size of the coloring agent fine particle is 0.2 µm.

Aqueous Dispersion of Fine Particles of Release Agent
Ester wax (behenyl behenate, melting point 75° C.): 100 parts by mass
Anionic surfactant (produced by Dai-Ichi Kogyo Seiyaku Co., Ltd.: NEOGEN RK): 10 parts by mass
Ion-exchange water: 880 parts by mass The foregoing materials are charged into a mixing container equipped with a stirring apparatus, then heated to 90° C., stirred by a shear stirring section having a rotor external diameter of 3 cm and a clearance of 0.3 mm under conditions of a number of rotor rotation of 19000 rpm and a number of screen rotation number of 19000 rpm while being circulated to CLEARMIX W motion (manufactured by M Technique Co., Ltd.), subjected to a dispersion treatment for 60 minutes, and then cooled to 40° C. under cooling treatment conditions of a number of rotor rotation of 1000 rpm, a number of screen rotation of 0 rpm and a cooling rate of 10° C./min, to thereby obtain an aqueous dispersion of fine particles of a release agent. The volume-average particle size of the fine particle of the release agent is 0.15 µm.

Preparation of Toner Base Particles
Aqueous dispersion 1 of resin fine particle: 40 parts by mass
Aqueous dispersion of coloring agent fine particle: 10 parts by mass
Aqueous dispersion of fine particles of a release agent: 20 parts by mass
Aqueous 1% by weight magnesium sulfate solution: 20 parts by mass
Ion-exchange water: 110 parts by mass The foregoing materials are dispersed using a homogenizer (manufactured by IKA: Ultratalax T50), and then heated to 45° C. in a water bath for heating while being stirred by a stirring blade. After keeping at 45° C. for 1 hour, it is confirmed by optical microscope observation that an aggregated particle having an average particle size of about 5.5 µm is formed. By the optical microscope observation, it is confirmed that the aggregated particle is formed. After 40 parts by mass of an aqueous 5% by mass trisodium citrate solution is added, the temperature is raised to 80° C. under continuous stirring and kept for 120 minutes, to thereby obtain a fused core particle. The particle size of the core particle is measured, and the median diameter on a volume basis is 5.5 µm.

In the present invention, in order to make the region A negatively chargeable by making the toner base particles positively chargeable, the toner base particles may contain a charge controlling agent having a negative tribocharging polarity. It is to be noted that in the case where a resin particle for the region A per se has tribocharging polarity even if containing no charge controlling agent, the charge controlling agent is not required to be contained.

The charge controlling agent for giving a negative tribocharging polarity to the resin particle for region A (resin particle having no flat portion) includes a metal-containing azo compound, a salicylic acid derivative, a metal complex and a phenol condensation product. Examples include Oil Black (Color Index 26150), Oil Black BY (produced by Orient Chemical Industries Co., Ltd.), BONTRON S-22 (produced by Orient Chemical Industries Co., Ltd.), a salicylic acid metal complex E-81 (produced by Orient Chemical Industries Co., Ltd.), a thioindigo pigment, a sulfonylamine derivative of copper phthalocyanine, Spironblack TRH (produced by Hodogaya Chemical Co., Ltd.), BONTRON S-34 (produced by Orient Chemical Industries Co., Ltd.), Nigrosine SO (produced by Orient Chemical Industries Co., Ltd.), Seles Schwaltz (R)G (produced by Farbenfabriken Bayer), Chromogen Schwaltz ETOO (C.I.NO.14645) and Azo Oil Black (R) (produced by National Aniline & Chemical Co., Ltd.). Among them, the salicylic acid metal complex E-81 is preferable.

The charge controlling agents can be used singly or in combination of a plurality thereof, and the amount of the charge controlling agent added to a binder resin is 0.001 to 5 parts by mass based on 100 parts by mass of the binder resin and can be 0.001 to 3 parts by mass.

<Method for Preparing Region B (Flat Portion)>
Then, a method for preparing the region B (flat portion) on the toner base particles will be described.

<Resin Fine Particle for Flat Portion>
Examples of a resin fine particle for a flat portion include a resin particle produced by a soap-free emulsification polymerization method.

A resin particle produced by a soap free emulsification polymerization method will be described. Generally, while the emulsification polymerization method is a method in which an emulsifier and a soluble polymerization initiator are added to and dissolved in an aqueous medium, thereafter a hardly soluble monomer is added to the aqueous medium and stirred under heating, and an initiator radical generated in an aqueous phase is bound to a monomer slightly dissolved in the aqueous phase to be in turn insoluble, thereby forming a particle nucleus, the soap-free emulsification polymerization method is a method in which an emulsifier is omitted from an emulsification polymerization system, and such a method is the same as in the emulsification polymerization method in that an initiator radical generated in an aqueous phase is bound to a monomer slightly dissolved in the aqueous phase to be in turn insoluble, thereby forming a particle nucleus. A particle to be produced in such a polymerization method generally has a larger particle size and a narrower particle size distribution than the particle from the emulsification polymerization. The soap free polymerization method can control a particle size within a range from 0.1 µm to 1 µm, and also achieve a particle having a sharp particle size distribution.

In the present invention, in order to make positive the tribocharging polarity of the resin fine particle for a flat portion on the surface of the toner base particles, the resin fine particle for a flat portion may contain a charge controlling agent for making tribocharging polarity positive. It is to be noted that the resin fine particle for a flat portion per se has tribocharging polarity even if containing no charge controlling agent, the charge controlling agent is not required to be contained.

For the charge controlling agent for giving a positive tribocharging polarity to the resin fine particle for a flat portion (region B), various organic or inorganic agents are used, and their examples include an azine compound, a quaternary ammonium salt and an onium compound. Their examples include Nigrosine Base EX (produced by Orient Chemical Industries Co., Ltd.), a quaternary ammonium salt P-51 (produced by Orient Chemical Industries Co., Ltd.), Nigrosine BONTRON N-01 (produced by Orient Chemical Industries Co., Ltd.), Sudan Chief Schwaltz BB (Solvent Black 3:Colr Index 26150), Fett Schwaltz HBN (C.I.NO.26150), brilliant spirit Schwaltz TN (produced by Farbenfabriken Bayer), Zabon Schwaltz X (produced by Farbwerke Hoechst AG), and alkoxylated amines, alkyl amides and molybdic acid chelate pigments. Among them, the quaternary ammonium salt P-51 is preferable.

The charge controlling agents can be used singly or in combination of a plurality thereof, and the amount of the charge controlling agent added to a binder resin is 0.001 to 5 parts by mass based on 100 parts by mass of the binder resin and can be preferably 0.001 to 3 parts by mass.

<Method for Preparing Flat Portion>

A flat portion is formed by using a core particle and a resin fine particle for a flat portion previously made.

First, water is charged in a water bath under continuous stirring to cool the core particle to 25° C. Then, 10.6 parts by mass of an aqueous dispersion of the resin fine particle for a flat portion is added. Herein, the addition amount of the aqueous dispersion of the resin fine particle for a flat portion is calculated by the following formula as an amount required for meeting the conditions in Table 1 when the core particle is assumed to be spherical and a 5.5 µm core particle is covered with a 0.18 µm resin fine particle for a flat portion. It is to be noted that the amount corresponds to an amount required for coveting the core particle with the resin fine particle for a flat portion by one layer when α=1 in the following formula 1.

Addition amount of aqueous dispersion of resin fine particle for flat portion=α×(4$r$×100/$R$)×($A$/100)× (100/$B$)      formula 1

R: Median diameter of core particle on volume basis (µm)
r: Median diameter of shell particle on volume basis (µm)
A: Mass of first resin contained in core (g)
B: mass concentration of resin fine particle for flat portion in aqueous dispersion of resin fine particle added (%)
α: variable that controls area rate of region B (flat portion) covering core particle Thereafter, stirring is carried out for 10 minutes, and 60 g of an aqueous 2% by mass calcium chloride solution is added dropwise and heated to 35° C. In such a state, a small amount of the liquid is extracted as needed and caused to pass through a microfilter of 2 µm, and the stirring is continued at 35° C. until the filtrate is transparent. After it is confirmed that the filtrate is transparent, the filtrate is heated to 40° C. and stirred for 1 hour, and then 35 parts by mass of an aqueous 5% by mass trisodium citrate solution is added, heated to 65° C. and stirred for 1.5 hours. Thereafter, the resultant liquid is cooled to 25° C. and then filtrated and separated into a solid and a liquid, and then 800 g of ion-exchange water is added to the solid content and stirred and washed for 30 minutes. Thereafter, the resultant is filtrated and separated into a solid and a liquid again. Such filtration and washing are repeated in order to eliminate an influence of a remaining surfactant, until the electric conductivity of the filtrate is 150 µS/cm or less. Then, the resultant solid content is dried to obtain a toner particle.

Thereafter, in the case where the resin fine particle for a flat portion insufficiently attaches to the surface of the core particle, the obtained toner base particles are left standing under a constant environment of the Tg of the core particle for 3 hours, thereby increasing an attaching area of the resin fine particle for a flat portion to the core particle.

Finally, in order to stably fit the resin fine particle for a flat portion to the surface of the core particle in a flat shape, the core particle to which the resin fine particle for a flat portion attaches is mechanically mixed by a hybridizer. For example, a hybridizer ((material of blade: SUS304), manufactured by Nara Machinery Co., Ltd.) is used to adjust the rotation speed and rotation time of a rotor, thereby obtaining toner base particles having a flat portion of a desired shape. Herein, the amount to be treated by the hybridizer at one time is 25 g.

Herein, various methods for analyzing particles are described.

<Measurements of Molecular Weight Distribution, Weight-Average Molecular Weight (Mw), Number-Average Molecular Weight (Mn), and the Like Measured by Gel Permeation Chromatography (GPC) of Tetrahydrofuran (THF) Soluble Content of Resin>

The molecular weight distribution, weight-average molecular weight (Mw), number-average molecular weight (Mn), and the like measured by gel permeation chromatography (GPC) of the tetrahydrofuran (THF) soluble content of the resin fine particle are determined as follows.

A column is stabilized in a heat chamber at 40° C., tetrahydrofuran (THF) as a solvent is allowed to flow through the column at the temperature at a flow rate of 1 ml/min, and about 100 µl of a THF sample solution is injected and measured. Upon the measurement of the molecular weight of the sample, the molecular weight distribution of the sample is calculated from a relationship between a logarithmic value of a calibration curve created by several monodisperse polystyrene standard samples, and a number of counts. As the standard polystyrene sample for creating a calibration curve, for example, a sample having a molecular weight of about $10^2$ to $10^7$, produced by Tosoh Corporation or Showa Denko K. K. is used, and at least ten standard polystyrene samples are appropriately used. As a detector, a RI (refractive index) detector is used. As a column, a combination of a plurality of commercial polystyrene gel columns may be used, and their examples include a combination of shodex GPC KF-801, 802, 803, 804, 805, 806, 807 and 800P manufactured by Showa Denko K. K., and a combination of TSKgel G1000H (HXL), G2000H (HXL), G3000H (HXL), G4000H (HXL), G5000H (HXL), G6000H (HXL), G7000H (HXL) and TSK guard column manufactured by Tosoh Corporation.

The sample is prepared as follows.

A resin (sample) is charged in tetrahydrofuran (THF), left standing for several hours, then sufficiently agitated, well mixed with THF (until coalescence of samples disappears), and left standing for additional 12 hours or longer. At this time, the time of standing in THF is to be 24 hours or longer. Thereafter, the resultant is allowed to pass through a sample treatment filter (pore size: 0.45 to 0.5 µm, for example, My Shori-disk H-25-5: manufactured by Tosoh Corporation, EKICRODISK 25CR: manufactured by German Science Japan, or the like can be utilized), thereby obtaining a sample for GPC. The concentration of the sample is adjusted so that the concentration of a resin component is 0.5 to 5 mg/ml. From the molecular weight distribution created, a molecular weight (Mp) on the top of a main peak and an amount of a component having a molecular weight of 500 or more and less than 2,000 relative to the total amount of components can be derived. The amount of a component having a molecular weight of 500 or more and less than 2,000 relative to the total amount of components can be, for example, calculated by subtracting a frequency distribution cumulative value up to a molecular weight of 500 from a frequency distribution cumulative value up to a molecular weight of 2000.

<Measurement of Acid Value of Resin>

The acid value of the resin is determined as described below. It is to be noted that a basic operation is according to JIS-K0070. The acid value means "mg" of potassium hydroxide required for neutralizing a free fatty acid, resin acid, and the like contained in 1 g of a sample.

(1) Reagents (a) Solvent: an ethyl ether/ethyl alcohol mixture (1+1 or 2+1) or a benzene/ethyl alcohol mixture (1+1 or 2+1) is neutralized with an N/10 potassium hydroxide-ethyl alcohol solution by using phenolphthalein as an indicator just before use.

(b) Phenolphthalein solution: 1 g of phenolphthalein is dissolved in 100 ml of ethyl alcohol (95% by volume).

(c) N/10 potassium hydroxide-ethyl alcohol solution: 7.0 g of potassium hydroxide is dissolved in the smallest possible amount of water, and ethyl alcohol (95% by volume) is added to amount to 1 litter, and the resultant is left standing for 2 to 3 days, followed by filtration. The evaluation is carried out according to JIS K8006 (basic matters regarding titration in content test of reagents).

(2) Operation

The resin (sample) (1 to 20 g) is precisely weighed, and 100 ml of the solvent and several drops of the phenolphthalein solution as an indicator are added thereto and sufficiently shaken until the sample is completely dissolved. In the case of a solid sample, the sample is dissolved under warming in a water bath. After cooling, the sample is titrated with the N/10 potassium hydroxide-ethyl alcohol solution and the end point of neutralization is defined as a point at which the indicator successively shows a fine red color for 30 seconds.

(3) Calculation Formula

The acid value is calculated by the following formula:

$$A = B \times f \times 5.611/S$$

A: Acid value

B: Amount of N/10 potassium hydroxide-ethyl alcohol solution used (ml)

f: Factor of N/10 potassium hydroxide-ethyl alcohol solution

S: Sample (g)

<Particle Size Distribution Analysis of Resin Fine Particle and Coloring Agent Fine Particle>

For analyzing the particle size distribution, a laser diffraction/scattering particle size distribution measuring apparatus (manufactured by Horiba Ltd., LA-950) is used and the particle size distribution is measured according to the operating manual of the apparatus. An aqueous surfactant solution is added dropwise to circulating water, and then a release agent particle dispersion is added dropwise until reaching an optimal concentration of the apparatus and dispersed by an ultrasonic wave for 30 seconds, thereby starting the measurement to determine a median diameter on a volume basis and a 90% cumulative particle size value (d90)

<Particle Size Distribution Analysis of Toner Base Particles>

The particle size distribution of the toner base particles is measured by a particle size distribution analysis by the Coulter method. As a measuring apparatus, a Coulter Counter TA-II or a Coulter Multisizer II (manufactured by Beckman Coulter, Inc) is used, and the particle size distribution is measured according to the operation manual of the apparatus. The electrolyte solution is an aqueous sodium chloride solution having a concentration of about 1% prepared by using first grade sodium chloride. As the electrolyte solution, for example, ISOTON-II (produced by Coulter Scientific Japan, Co.) can be used. A specific measurement method is as follows: 0.1 to 5 ml of a surfactant (that can be alkylbenzenesulfonate) is added to 100 to 150 ml of the aqueous electrolyte solution and also 2 to 20 mg of a measurement sample (toner particle) is added. The electrolyte solution in which the sample is suspended is subjected to a dispersion treatment by using an ultrasonic dispersing unit for about 1 to 3 minutes. With respect to the obtained dispersion-treated solution, the volume and number of the toner particle having a size of 2.00 µm or more are measured by using the measuring apparatus equipped with a 100 µm aperture as an aperture, and the volume distribution and number distribution of the toner particle are calculated. From the calculated results, the weight average particle diameter (D4) is determined.

Herein, a method for analyzing the region B (flat portion) is described.

<Polarity Distribution on Surface of Toner Base Particles>

The polarity distribution on the surface of the toner base particles is measured by using a scanning probe microscope. Hereinafter, an example of the measurement method is shown.

SPM apparatus: Scanning probe microscope Nano-IM (manufactured by Pacific Nanotechnology (PNI))

Measurement mode: close contact, surface potential measurement mode KFM and close contact mode AFM are measured simultaneously.

Probe: EFM-SP-10P (AFM probe for measuring electric force (ceramic mounting type), manufactured by PNI)

Resolution: Number of X data: 512, Number of Y data: 512

In the present invention, a silver tape is put on a sample plate for securing a sample, toner base particles formed by mixing and tribocharging a magnetic particle to be used in preparing a two-component developer described later and a similar magnetic particle is set heaping full in a magnet, and a toner particle is blown off by compressed air on the tape, thereby preparing a sample. The measurement area is an area having a square of 3 µm of the center portion of the surface of the toner base particles to be measured by a scanning probe microscope. With respect to the toner base particles measured, toner base particles having a weight average particle size (D4) substantially equal to the weight average particle size (D4) measured by the Coulter counter method are randomly selected and measured, and 20 or more different toner base particles are measured. Within 1 hour after the sample is prepared, a surface form and a KFM image of the toner particle are measured at the same time. From the KFM image, the polarity distribution on the surface of the toner base particles is obtained. Therefore, it can be confirmed that the region A (core particle surface) has a polarity different from that of the region B (flat portion), and the region A is negatively chargeable and the region B is positively chargeable with respect to the magnetic particle that has rubbed the toner at the time of preparing the sample.

With respect to the toner in which the external additive is externally added to the toner base particles, in the case where the surface of the toner base particles is measured by using a scanning probe microscope, the external additive is required to be removed, and examples of a specific method includes the following.

1) A toner (45 mg) is charged in a sample bottle, and 10 ml of methanol is added.
2) A sample is dispersed by an ultrasonic washing machine for 1 minute to allow an external additive to be separated.
3) Suction filtration (10 μm membrane filter) is conducted to separate a toner particle from the external additive. In the case of a toner containing a magnetic material, only a supernatant liquid may be separated by applying a magnet to the bottom of the sample bottle to immobilize the toner particle.
4) The above 2) and 3) are carried out three times in total, and the resultant toner base particles are sufficiently dried by a vacuum drier (room temperature).

After the toner base particles in which the external additive have been removed is observed by a scanning electron microscope to confirm no external additive, the surface of the toner base particles can be observed by a scanning probe microscope. In the case where the external additive is not sufficiently removed, the above 2) and 3) are repeatedly carried out until the external additive is sufficiently removed, and then the surface of the toner base particles is observed by a scanning probe microscope.

<Average Height of Region B (Flat Portion)>

Herein, the average height of the region B (flat portion) means a distance from the tip portion of the flat portion to the external surface of a spherical particle along a perpendicular line descending from the tip portion to the center of the spherical particle. The height of the region B (flat portion) is measured by using a scanning probe microscope. Hereinafter, an example of the measurement method is shown.

SPM apparatus: Scanning probe microscope Nano-IM (manufactured by Pacific Nanotechnology (PNI))
measurement mode: close contact mode AFM
Probe: P-MCU-SICC-0 (pre-mounted probe for AFM, normal type for close contact mode, manufactured by PNI)
Resolution: Number of X data: 256, Number of Y data: 256

In the present invention, a carbon tape is put on a sample plate for immobilizing a sample, toner base particles are set heaping full, toner base particles not immobilized by the tape are blown off by compressed air and then left standing for 3 days or longer, and then the measurement is carried out. The measurement area is an area containing the region B of the surface of the toner base particles to be measured by a scanning probe microscope. With respect to the toner base particles measured, toner base particles having a weight average particle size (D4) substantially equal to the weight average particle size (D4) measured by the Coulter counter method are randomly selected and measured, and the surface form of the toner base particles is measured. With respect to 20 or more different toner base particles, five areas containing the region B are measured for each particle.

Figure 3A:
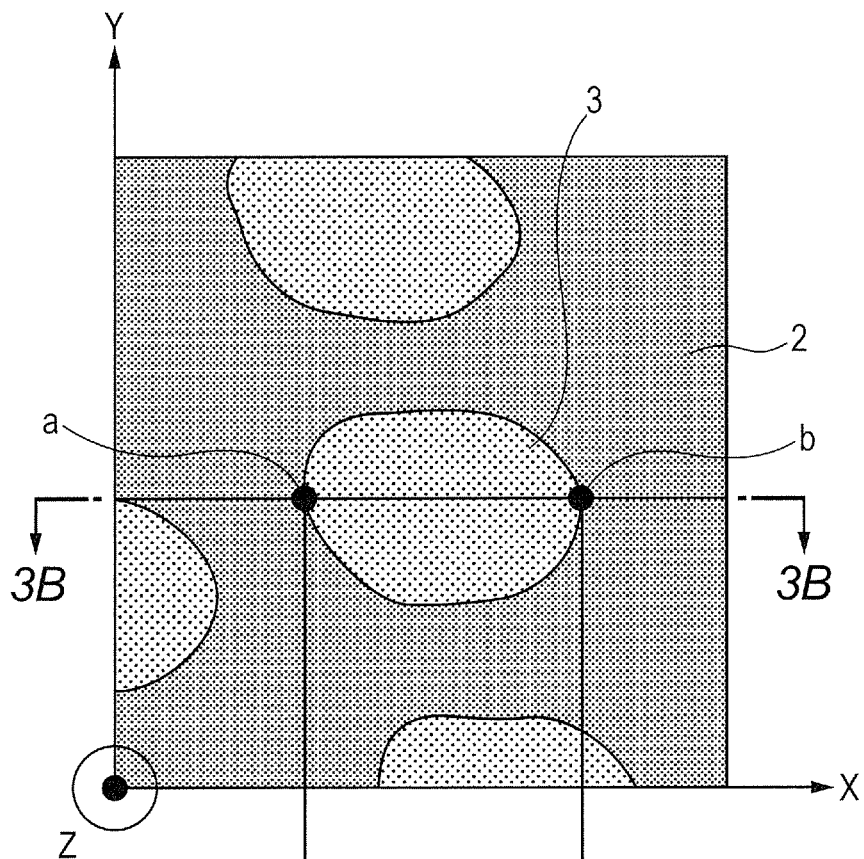
FIGS. 3A and 3B are schematic views illustrating a method for measuring an average height of a region B (flat portion).
Figure 3B:
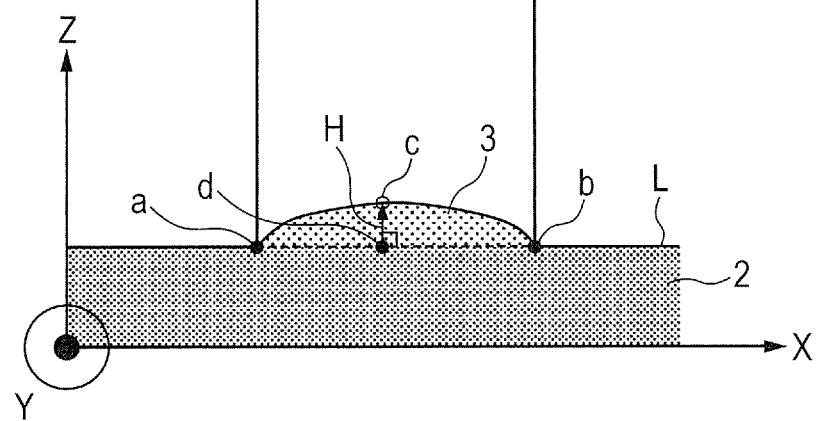
Figure 4A:
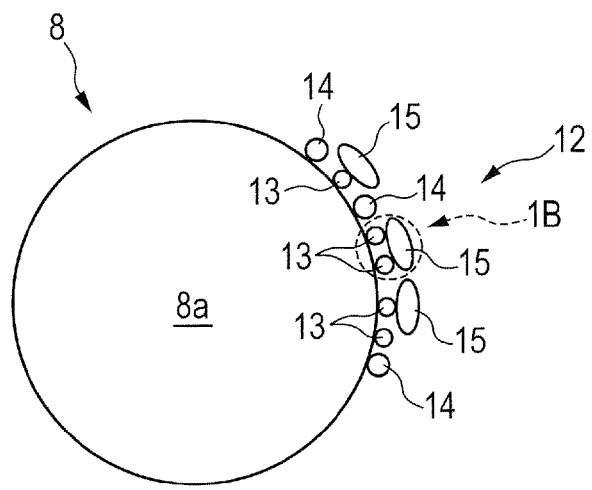
FIGS. 4A, 4B, 4C and 4D are views illustrating a conventional example of the present invention.
Figure 4B:
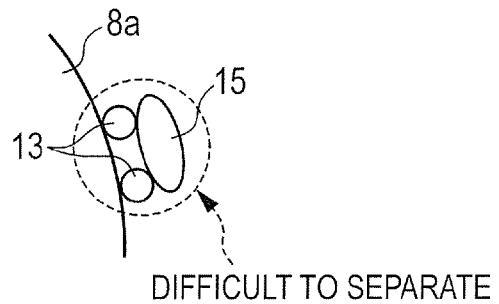
Figure 4C:
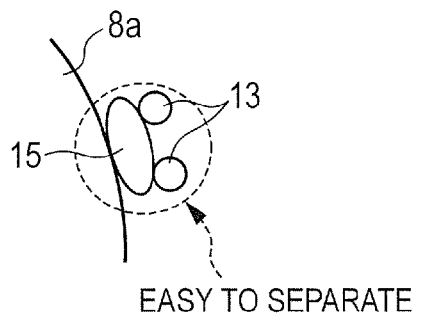
Figure 4D:
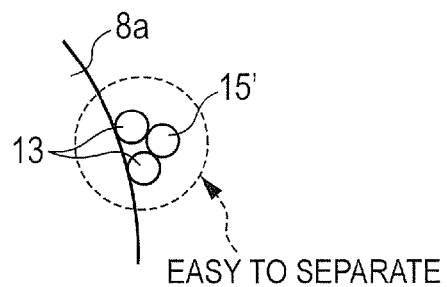

FIGS. 3A and 3B are schematic views illustrating a method for measuring the average height of the region B (flat portion). With respect to the area containing the region B on the surface of the toner base particles illustrated in FIG. 3A, a cross-section analysis at an XZ plane of the region B on each of 256 lines measured (flat portion) 3 is carried out. As an example, the figure obtained by the cross-section analysis at an XZ plane on a line 3B-3B in FIG. 3A is illustrated in FIG. 3B. A distance H (distance from a point c to a point d) of a perpendicular line ascending from a straight line connecting two intersection points (a, b) of the region A (core particle surface) 2 to a top point c of the region B 3 of the flat shape in FIG. 3B, the distance being averaged by the number of measurement points, is defined as the average height of the region B (flat portion).

With respect to the toner in which the external additive is externally added to the toner base particles, in the case where the surface of the toner base particles is measured by using a scanning probe microscope, the external additive is required to be removed, and specifically, the surface of the toner in which the external additive is removed by the above described method is observed.

<Average Coverage: Cb by First External Additive on Region B (Flat Portion)>

The coverage with a first external additive in the region B (flat portion) is determined by measuring a 2,000 times enlarged photographic image obtained from a scanning electron microscope, by using an image processing analyzing apparatus (product name: Luzex 3, manufactured by Nireco Corporation). With respect to the region B (flat portion), one region B (flat portion) is observed perpendicularly from above by a microscope, the area covered with the first external additive and the area of the region B (flat portion) are two-dimensionally digitized for the region B (flat portion) to determine each area from the image analysis, and the ratio of the area covered with the first external additive to the area of the region B (flat portion) is calculated as the coverage Cb with the first external additive. The operation is carried out for 300 points or more of the region B (flat portion) particles that are randomly extracted, and the results are averaged.

<Coverage: Ca with First External Additive on Region A (Surface of Toner Base Particles, other than Flat Portion)>

The coverage with a first external additive in the region A (the surface of the toner base particles, other than the flat portion) is determined by measuring a 2,000 times enlarged photographic image obtained from a scanning electron microscope, by using an image processing analyzing apparatus (product name: Luzex 3, manufactured by Nireco Corporation), in the same manner as in the coverage Cb with the first external additive in the region B (flat portion). With respect to the toner base particles, one toner base particle is observed perpendicularly from above by a microscope, the area covered with the first external additive and the area of the region A (core particle surface) are two-dimensionally digitized for the region A (core particle surface) to determine each area from the image analysis, and the ratio of the area covered with the first external additive to the area of the region A (core particle surface) is calculated as the coverage Ca with the first external additive. The operation is carried out for 300 points or more of the toner base particles that are randomly extracted, and the results are averaged.

<Average Area of Region B (Flat Portion)>

The area of the flat portion is expressed by a round or elliptical area at the bottom on the surface of a spherical particle, of a substantially spherical or ellipsoidal flat portion on the enlarged image obtained from a scanning electron microscope, with respect to the region B (flat portion) confirmed by the polarity distribution on the surface of the toner base particles measured by using a scanning probe microscope. The operation is carried out for 300 points or more of the region B (flat portion) particles that are randomly extracted, and the results are averaged.

<Occupying Area Rate by Region B (Flat Portion) on Surface of Toner Base Particles>

The occupying area rate by the region B (flat portion) on the surface of the spherical particle is expressed by a ratio of the sum of a round or elliptical area at the bottom on the surface of a spherical particle, of a substantially spherical or ellipsoidal flat portion on the enlarged image obtained from a scanning electron microscope, with respect to the region B (flat portion) confirmed by the polarity distribution on the surface of the toner base particles measured by using the above-described scanning probe microscope, to the surface area of the toner base particles regarded as having no flat portion.

<Method for Adding External Additive>

An external additive particle can be blended with toner base particles by, for example, a high speed mixing machine. Specific examples thereof include a Henschel mixer (manufactured by Mitsui Miike Machinery), a Mechanofusion system (manufactured by Hosokawa Micron Corporation) and Mechanomill (manufactured by Okada Seiko Co., Ltd.). However, an apparatus for holding the external additive particle on the surface of the toner particle is not limited to the above machines. As an example, in the case where a Henschel mixer is used, the shape and peripheral speed of a stirring blade, the mixing time, and the like are appropriately adjusted to allow the external additive particle to favorably attach. In the present invention, by utilizing a constant temperature bath upon utilizing the above blending apparatus, a blending tank can be kept within the glass transition temperature ±5° C. of a toner resin.

The first external additive 4 and second external additive 5 of the present invention are respectively an inorganic fine particle having a number-average primary particle size of 80 nm or more and 150 nm or less and an inorganic fine particle having a number-average primary particle size of 10 nm or more and 60 nm or less, such as silica, alumina and titanium oxide. For example, any silica produced by using a conventionally known technique such as a vapor-phase decomposition method, a combustion method or a deflagration method can be used, and spherical hydrophobic silica having a number average particle size of 80 nm or more and 150 nm or less and spherical hydrophobic silica having a number average particle size of 10 nm or more and 60 nm or less can be used for the first external additive 4 and second external additive 5, respectively, the silica being produced by a known sol-gel method in which alkoxysilane is subjected to hydrolysis and condensation reaction by a catalyst in an organic solvent in which water is present, and the resultant silica sol suspension is subjected to solvent removal, dried and formed into a particle. Since the silica obtained by the sol-gel method has a moderate particle size and particle size distribution, and is monodisperse and spherical, the silica is easily dispersed on the surface of the toner particle uniformly and allows the physically attaching force of the toner to be made smaller by a stable spacer effect. Since the silica has a large specific resistance, the charge injected from a transfer electric field is decreased, and it is considered that the change in toner charge amount distribution can be made smaller even after a plurality of transfer steps. It is presumed that the use of the silica obtained by a sol-gel method enables maintaining favorable chargeability and transferability over a longer period.

The surface of the silica obtained by a sol-gel method may also be subjected to a hydrophobizing treatment, and a silane compound can be used as a hydrophobizing treatment agent. Examples of the silane compound include hexamethyldisilazane, monochlorosilane such as trimethylchlorosilane and triethylchlorosilane, monoalkoxysilane such as trimethylmethoxysilane and trimethylethoxysilane, monoaminosilane such as trimethylsilyldimethylamine and trimethylsilyldiethylamine, and monoacyloxysilane such as trimethylacetoxysilane.

The amount of the inorganic fine powder added to the toner of the present invention is 0.3 to 5.0 parts by mass, and is more preferably 0.5 to 2.5 parts by mass, based on 100 parts by mass of the toner particle.

Then, the addition of the external additive added to the toner base particles will be described. As for two external additives having different particle sizes, it is preferable that the first external additive 4 having a larger particle size be first added to the toner base particles having a flat portion and the second external additive 5 having a smaller particle size be then added. By such externally adding order, the first external additive 4 first externally added attaches to a flat portion having a charging polarity with respect to a magnetic particle opposite to that of the first external additive 4 with more certainty, and is embedded by repeating image output to thereby serve as a supporting strut, and suppresses the embedding of the second external additive 5 subsequently externally added, that functions to maintain charge, in the toner base particles.

<Magnetic Particle (Magnetic Carrier)>

As the magnetic particle (magnetic carrier), for example, a particle of a metal, such as iron, lithium, calcium, magnesium, nickel, copper, zinc, manganese, chromium and rare earth, whose surface is or is not oxidized, particles of an alloy and oxide of the metal, and ferrite can be used.

A covered carrier in which the surface of the magnetic carrier particle is covered with a resin can be particularly used in a developing method in which an AC bias is applied to a developing sleeve. As a covering method, a conventional known method such as a method in which a coating liquid prepared by dissolving or suspending a covering material such as a resin is allowed to attach to the surface of the magnetic carrier core particle, or a method in which a magnetic carrier core particle and a covering material are mixed in the form of powder can be applied.

The magnetic carrier can be particularly a magnetic carrier having a magnetic fine particle dispersion type resin core formed by at least dispersing a magnetic fine particle in a binder resin, and a covering layer containing a covering resin covering the surface of the magnetic fine particle dispersion resin core.

As a method for producing the magnetic fine particle dispersion type resin core constituting the magnetic carrier, there is a method in which a monomer constituting the binder resin is mixed with the magnetic fine particle and polymerized to thereby obtain the magnetic fine particle dispersion type core. At this time, examples of the monomer for use in polymerization include a vinyl-type monomer for forming a vinyl-type resin; bisphenols and epichlorohydrin for forming an epoxy resin; phenols and aldehydes for forming a phenol resin; and urea and aldehydes and melamine and aldehydes for forming a urea resin.

For example, as a method for producing the magnetic fine particle dispersion core particle by using a curable phenol resin, there is a method in which the magnetic fine particle is charged in an aqueous medium, and phenols and aldehydes are polymerized in the aqueous medium in the presence of a basis catalyst to thereby obtain the magnetic fine particle dispersion type core.

As another method for producing the magnetic fine particle dispersion type resin core constituting the magnetic carrier, there is a method in which a vinyl-type or non-vinyl-type thermoplastic resin as a binder resin, a magnetic material and other additive are sufficiently mixed by a mixing machine, then melted and kneaded by using a kneading machine such as a heating roll, a kneader or an extruder, and cooled, followed by grinding and classification. In this case, the resultant magnetic fine particle dispersion type resin core can be thermally or mechanically treated to be sphered, and then used. The binder resin is preferably a thermosetting resin such as a phenol resin, a melamine resin or an epoxy resin because of being excellent in durability, impact resistance and heat resistance. In particular, in order to more suitably exert the effect of the present invention, the binder resin is more preferably a phenol resin.

Examples of the magnetic fine particle contained in the magnetic fine particle dispersion type resin core include a ferromagnetic iron oxide particle powder such as magnetite and ferrite represented by a general formula $MO \cdot Fe_2O_3$ or $M \cdot Fe_2O_4$, a spinel ferrite particle powder containing one or two or more metals other than iron (Mn, Ni, Zn, Mg, Cu and the like), a magnetoplumbite-type ferrite particle powder such as barium ferrite, and a fine particle powder of iron or an iron alloy having an oxide covering film on the surface. In the general formula of magnetite, ferrite and the like, M denotes a divalent or monovalent metal ion (Mn, Fe, Ni, Co, Cu, Mg, Zn, Cd, Li and the like), and a single metal or a plurality of metals can be used as M. As the magnetic fine particle, magnetite or maghemite can be particularly preferably used, and magnetite is more preferable because of being inexpensive.

The number average particle size of the magnetic fine particle can be 0.02 to 3 μm, and if taking into consideration the strength of the magnetic fine particle dispersion type resin core, the number average particle size of the magnetic fine particle can be 0.05 to 1 μm. The shape may be any of particle, sphere and needle-shape.

The magnetic fine particle dispersion type resin core may contain a non-magnetic inorganic fine particle together with the magnetic fine particle. As an example of the non-magnetic inorganic fine particle, a fine particle such as titanium oxide, silica, alumina, zinc oxide, magnesium oxide, hematite, goethite and ilmenite can be used. Hematite, zinc oxide, titanium oxide and the like that are less different from the magnetic fine particle in terms of specific weight are more preferable. The number average particle size of the non-magnetic inorganic compound fine particle for use in producing the magnetic fine particle dispersion type resin core is preferably 0.05 to 5 μm, and if taking into consideration the strength of the magnetic fine particle dispersion type resin core, the number average particle size of the non-magnetic inorganic fine particle is more preferably 0.1 to 3 μm.

The covering material on the surface of the magnetic fine particle dispersion type resin core includes a silicone resin, a polyester resin, a styrene resin, an acrylic resin, polyamide, polyvinylbutyral and an aminoacrylate resin. The materials are used singly or in combination of a plurality thereof. The treatment amount of the covering material is preferably 0.1 to 30% by mass, and further preferably 0.5 to 20% by mass, based on the total mass of the magnetic fine particle dispersion type resin core. The average particle size of such a carrier is 10 to 100 μm, and can be preferably 20 to 70 μm.

The number average particle size of the magnetic carrier is preferably 15 to 60 μm in relation to the weight average particle size of the toner, and further preferably 25 to 50 μm. Examples of a method for adjusting the magnetic carrier so as to have the above average particle size include a method in which the adjustment is carried out by classification using a sieve. In particular, in order to conduct classification with high accuracy, sieving can be repeated more than once by using a sieve having an appropriate opening. A method is also effective in which a sieve whose mesh opening shape is controlled by plating is used.

EXAMPLES

Hereinafter, each Example and Comparative Example will be described.

Example 1

In the above embodiment, a salicylic acid metal complex E-81 as a charge controlling agent was added to a core particle having no flat portion for forming a region A to thereby make the core particle negatively chargeable, and a quaternary ammonium salt P-51 as a charge controlling agent was added to a fine particle for a flat portion for forming a region B to thereby make the fine particle positively chargeable. In formula 1 for determining the amount of an aqueous dispersion of a resin fine particle for a region B, variable α was set to 0.6. The mixing operation with a hybridizer in which the rotation speed and rotation time of the rotor were set to 13000 rpm and 1 minute, respectively, was defined as one set, and the set was carried out 5 times. As a large particle size external additive 4, 2.5 parts by mass of a negatively chargeable silica having a number-average primary particle size of 80 nm was added, and as a small particle size external additive, 0.5 parts by mass of a negatively chargeable silica having a number-average primary particle size of 10 nm was added.

With the toner prepared under the above conditions, a two-component type developer was prepared by the following method and subjected to image evaluation. The measurement results and evaluation results are shown in Table 1.

Method for Preparing Two-Component Developer

A toner obtained in each of Examples and Comparative Examples is mixed with a magnetic particle and formed into a two-component type developer. In the present Example, a magnetic particle obtained by subjecting a ferrite particle having a volume-average particle size of 35 μm to a silicon coating treatment was used as the magnetic particle. The mixing proportions of the toner was 8.0% by mass.

Image Evaluation Method

As an apparatus for use in image evaluation, IR-C5180 manufactured by Canon Kabushiki K. K. was used. The prepared two-component developer was filled in a developing unit, and then left standing under an environment of 23° C. and 50% RH for 10 hours. Thereafter, the image output condition was adjusted so that the maximum toner amount on paper was 0.60 mg/cm$^2$, and an image output duration test was carried out on A4-size paper under a condition of an image area ratio of 1%. Such a test was carried out until the number of image output sheets reached 10000. Two evaluation items were solid image uniformity and transfer efficiency at the time of outputting 10000 sheets. Herein, solid image uniformity and transferability were evaluated as described below, and a toner particle having no "C" in the evaluation results was defined as passing.

(Solid Image Uniformity)

After outputting 10000 sheets, a solid image on the entire sheet (maximum loading amount on the entire sheet) was output on a A4 paper sheet, and the uniformity of the density was examined. Generally, deterioration in duration of the toner causes reductions in transfer efficiency and image density, thereby leading to variation in density. Such a phenomenon was visually confirmed.

The evaluation criteria were as follows:
A: There is no variation in density over the entire sheet
B: There is variation in density in part
C: There is variation in density overall
Transferability After outputting 10000 sheets, a solid image was output, a transfer residual toner on a photosensitive drum at the time of forming the solid image was stripped by taping by a transparent adhesive tape made of polyester, and difference in density by subtracting the density of a sample obtained by applying only the adhesive tape on a paper sheet from the density of a sample obtained by applying the adhesive tape that had been used to strip the residual toner on a paper sheet was calculated. The difference in density was rated as follows. Herein, each density was measured by the X-Rite color reflection densitometer.

(Evaluation Criteria)
A: less than 0.1
B: 0.1 or more and less than 0.3
C: 0.3 or more Example 2

In Example 2, the variable number $\alpha$ was 0.7 in the formula 1 for determining the addition amount of an aqueous dispersion of a resin fine particle for a region B. The mixing operation with a hybridizer in which the rotation speed and rotation time of the rotor were set to 13000 rpm and 1 minute, respectively, was defined as one set, and the set was carried out 10 times. Except for these conditions, a toner was prepared in the same manner as in Example 1.

With the toner prepared under the above conditions, a two-component type developer was prepared by the method described below and subjected to image evaluation. The measurement results and evaluation results are shown in Table 1.

Example 3

In Example 3, the variable number $\alpha$ was 0.4 in the formula 1 for determining the addition amount of an aqueous dispersion of a resin fine particle for a region B. The mixing operation with a hybridizer in which the rotation speed and rotation time of the rotor were set to 13000 rpm and 1 minute, respectively, was defined as one set, and the set was carried out 2 times. Except for these conditions, a toner was prepared in the same manner as in Example 1.

With the toner prepared under the above conditions, a two-component type developer was prepared by the method described below and subjected to image evaluation. The measurement results and evaluation results are shown in Table 1.

Example 4

In Example 4, a toner was prepared in the same manner as in Example 1 except that 2.5 parts by mass of a negatively chargeable silica having a number-average primary particle size of 150 nm was added as the large particle size external additive 4 and 0.5 parts by mass of a negatively chargeable silica having a number-average primary particle size of 10 nm was added as the small particle size external additive.

With the toner prepared under the above conditions, a two-component type developer was prepared by the method described below and subjected to image evaluation. The measurement results and evaluation results are shown in Table 1.

Example 5

In Example 5, a toner was prepared in the same manner as in Example 1 except that 1.0 part by mass of a negatively chargeable silica having a number-average primary particle size of 80 nm was added as the large particle size external additive 4 and 0.5 parts by mass of a negatively chargeable silica having a number-average primary particle size of 10 nm was added as the small particle size external additive. With the toner prepared under the above conditions, a two-component type developer was prepared by the method described below and subjected to image evaluation. The measurement results and evaluation results are shown in Table 1.

Example 6

In Example 6, a toner was prepared in the same manner as in Example 1 except that 2.5 parts by mass of a negatively chargeable silica having a number-average primary particle size of 130 nm was added as the large particle size external additive 4 and 0.5 parts by mass of a negatively chargeable silica having a number-average primary particle size of 60 nm was added as the small particle size external additive. With the toner prepared under the above conditions, a two-component type developer was prepared by the method described below and subjected to image evaluation. The measurement results and evaluation results are shown in Table 1.

Example 7

In Example 7, a toner was prepared in the same manner as in Example 1 except that 2.5 parts by mass of a negatively chargeable silica having a number-average primary particle size of 80 nm was added as the large particle size external additive 4 and 0.5 parts by mass of a negatively chargeable silica having a number-average primary particle size of 30 nm was added as the small particle size external additive. With the toner prepared under the above conditions, a two-component type developer was prepared by the method described below and subjected to image evaluation. The measurement results and evaluation results are shown in Table 1.

Comparative Example 1

In Comparative Example 1, the variable $\alpha$ was 0.7 in the formula 1 for determining the addition amount of an aqueous dispersion of a resin fine particle for a region B. The mixing operation with a hybridizer in which the rotation speed and rotation time of the rotor were set to 13000 rpm and 1 minute, respectively, was defined as one set, and the set was carried out 12 times. As the large particle size external additive 4, 3.5 parts by mass of a negatively chargeable silica having a number-average primary particle size of 80 nm was added. Except for these conditions, a toner was prepared in the same manner as in Example 1. With the toner prepared under the above conditions, a two-component type developer was prepared by the method described below and subjected to image evaluation. The measurement results and evaluation results were shown in Table 1.

Comparative Example 2

In Comparative Example 2, the variable $\alpha$ was 0.3 in the formula 1 for determining the addition amount of an aqueous dispersion of a resin fine particle for a region B. The mixing operation with a hybridizer in which the rotation speed and rotation time of the rotor were set to 13000 rpm and 1 minute, respectively, was defined as one set, and the set was carried out once. Except for these conditions, a toner was prepared in the same manner as in Example 1. With the toner prepared under the above conditions, a two-component type developer was prepared by the method described below and subjected to image evaluation. The measurement results and evaluation results are shown in Table 1.

Comparative Example 3

In Comparative Example 3, a toner was prepared in the same manner as in Example 1 except that 0.2 parts by mass of a negatively chargeable silica having a number-average primary particle size of 80 nm was added as the large particle size external additive 4. With the toner prepared under the above conditions, a two-component type developer was prepared by the method described below and subjected to image evaluation. The measurement results and evaluation results are shown in Table 1.

Comparative Example 4

In Comparative Example 4, a toner was prepared in the same manner as in Example 1 except that 2.5 parts by mass of a negatively chargeable silica having a number-average primary particle size of 75 nm was added as the large particle size external additive 4. With the toner prepared under the above conditions, a two-component type developer was prepared by the method described below and subjected to image evaluation. The measurement results and evaluation results are shown in Table 1.

Comparative Example 5

In Comparative Example 5, a toner was prepared in the same manner as in Example 1 except that 2.5 parts by mass of a negatively chargeable silica having a number-average primary particle size of 160 nm was added as the large particle size external additive 4. With the toner prepared under the above conditions, a two-component type developer was prepared by the method described below and subjected to image evaluation. The measurement results and evaluation results are shown in Table 1.

Comparative Example 6

In Comparative Example 6, a toner was prepared in the same manner as in Example 1 except that 2.5 parts by mass of a negatively chargeable silica having a number-average primary particle size of 120 nm was added as the large particle size external additive 4 and 0.5 parts by mass of a negatively chargeable silica having a number-average primary particle size of 75 nm was added as the large particle size external additive 5. With the toner prepared under the above conditions, a two-component type developer was prepared by the method described below and subjected to image evaluation. The measurement results and evaluation results are shown in Table 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-229342, filed Oct. 19, 2011, which is hereby incorporated by reference herein in its entirety.

What is claimed is:

1. A toner comprising toner base particles each of which contains a binder resin and a coloring agent, and an external additive,
wherein:
   each of the toner base particles has a domain-matrix structure containing a region A as a matrix region and a region B as a domain region on a surface thereof,
   a polarity of a triboelectric charge of the region A with respect to a magnetic carrier to be used for charging the toner is different from that of the region B,
   the region B has a flat shape having an average height of 78 nm or more and 163 nm or less,
   a polarity of a triboelectric charge of the external additive with respect to the magnetic carrier is different from that of the region B,
   the external additive contains
      a first external additive X having a number-average primary particle size of 80 nm or more and 150 nm or less, and
      a second external additive Y having a number-average primary particle size of 10 nm or more and 60 nm or less, and wherein
   an average coverage Cb (%) with the first external additive X in the region B is 27% or more and less than 100%, and
   an average coverage Ca (%) with the first external additive X in the region A is 12% or less.

TABLE 1

| | Region B | | | First external additive | | | Second external additive | Evaluation results | |
|---|---|---|---|---|---|---|---|---|---|
| | Average height [nm] | Average area [μm$^2$] | Occupying area rate [%] | Number-average primary particle size [nm] | Cb [%] | Ca [%] | Number-average primary particle size [nm] | Image density uniformity | Transferability |
| Example 1 | 120 | 1.1 | 42 | 80 | 73 | 7 | 10 | A | A |
| Example 2 | 78 | 1.5 | 50 | 80 | 60 | 12 | 10 | A | B |
| Example 3 | 163 | 0.6 | 27 | 80 | 66 | 10 | 10 | B | A |
| Example 4 | 120 | 1.1 | 42 | 150 | 40 | 8 | 10 | B | A |
| Example 5 | 120 | 1.1 | 42 | 80 | 27 | 5 | 10 | B | B |
| Example 6 | 120 | 1.1 | 42 | 130 | 50 | 10 | 60 | B | A |
| Example 7 | 120 | 1.1 | 42 | 80 | 70 | 9 | 30 | A | A |
| Comparative Example 1 | 50 | 1.8 | 61 | 80 | 90 | 20 | 10 | B | C |
| Comparative Example 2 | 170 | 0.4 | 24 | 80 | 60 | 10 | 10 | C | B |
| Comparative Example 3 | 120 | 1.1 | 42 | 80 | 10 | 3 | 10 | C | C |
| Comparative Example 4 | 120 | 1.1 | 42 | 75 | 63 | 12 | 10 | C | B |
| Comparative Example 5 | 120 | 1.1 | 42 | 160 | 37 | 15 | 10 | A | C |
| Comparative Example 6 | 120 | 1.1 | 42 | 120 | 50 | 12 | 75 | C | A |

2. The toner according to claim 1, wherein the region A is negatively chargeable with respect to the magnetic carrier, the region B is positively chargeable with respect to the magnetic carrier, and the external additive is negatively chargeable with respect to the magnetic carrier.

3. The toner according to claim 1, wherein the region B is formed by fixing resin fine particles having a positive tribocharging polarity with respect to the magnetic carrier to a surface of a core particle.

4. The toner according to claim 1, wherein:
   an average area of the region B, obtained by a scanning probe microscope, is 0.5 μm² or more and 1.5 μm² or less, and
   an occupying area rate by the region B on a surface of the toner base particles, obtained by a scanning electron microscope, is 27% or more and 50% or less.

5. A method for producing a toner according to claim 1, comprising:
   forming the toner base particles by preparing a dispersion containing the binder resin and the coloring agent,
   forming a mixture by mixing with the first external additive and the toner base particles, and
   adding the second external additive to the mixture and mixing them.

6. The method for producing a toner according to claim 5, wherein:
   the region A is negatively chargeable with respect to the magnetic carrier,
   the region B is positively chargeable with respect to the magnetic carrier, and
   the external additive is negatively chargeable with respect to the magnetic carrier.

7. The method for producing a toner according to claim 6, wherein:
   each of the toner base particles is formed by fixing resin fine particles having a positive tribocharging polarity with respect to the magnetic carrier to a surface of a core particle.

8. A two-component type developer containing a toner and a magnetic carrier,
   wherein the toner comprising toner base particles each of which contains a binder resin and a coloring agent, and an external additive,
   wherein each of the toner base particles has a domain-matrix structure containing a region A as a matrix region and a region B as a domain region on a surface thereof,
   wherein a polarity of a triboelectric charge of the region A with respect to the magnetic carrier is different from that of the region B, and
   wherein the region B has a flat shape having an average height of 78 nm or more and 163 nm or less,
   a polarity of a triboelectric charge of the external additive with respect to the magnetic carrier is different from that of the region B,
   the external additive contains a first external additive X having a number-average primary particle size of nm or more and 150 nm or less and a second external additive Y having a number-average primary particle size of 10 nm or more and 60 nm or less, and
   an average coverage Cb (%) with the first external additive X in the region B is 27% or more and less than 100% and an average coverage Ca (%) with the first external additive X in the region A is 12% or less.

* * * * *